UNITED STATES PATENT OFFICE.

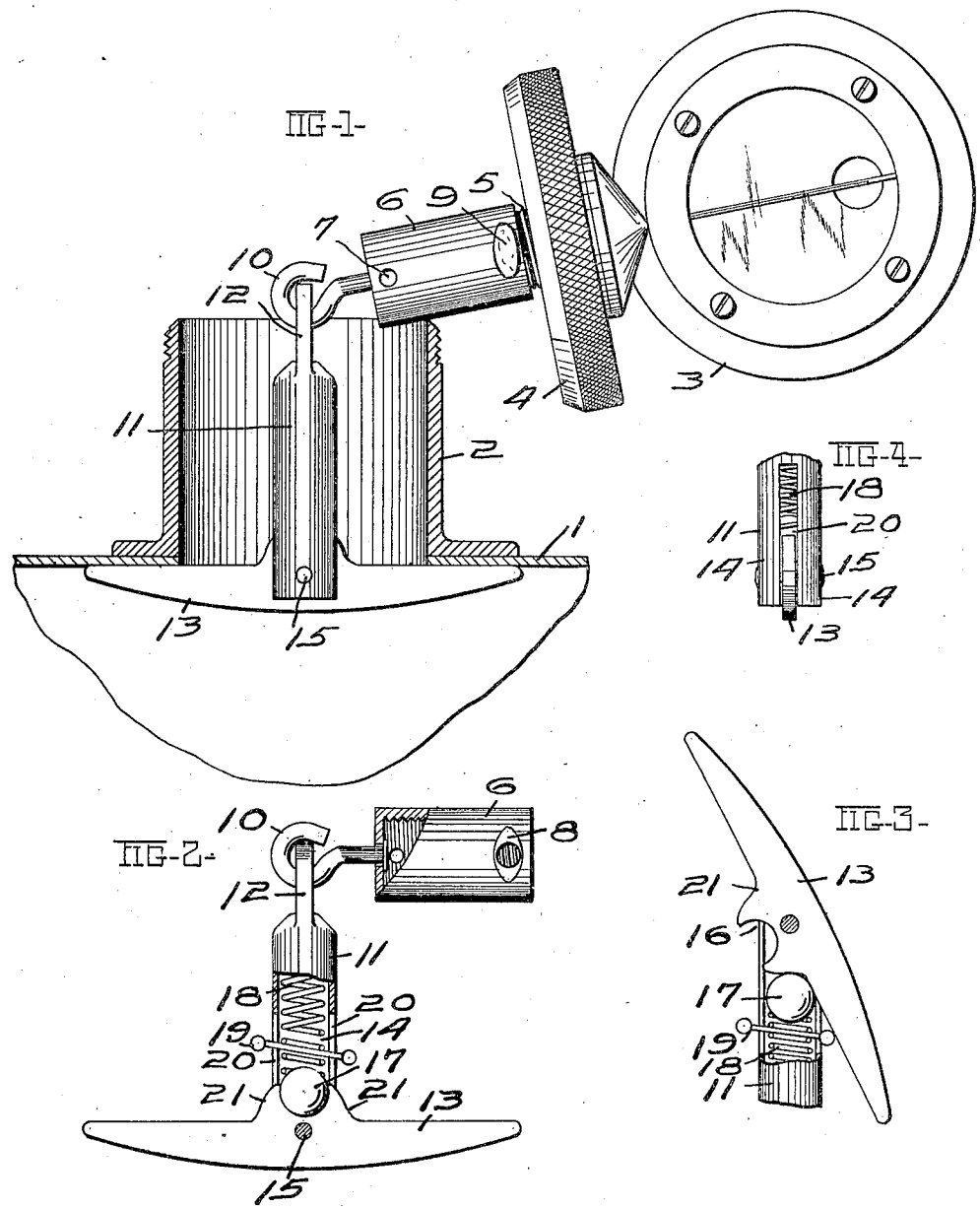

LEE L. WINTERS, OF ANN ARBOR, MICHIGAN.

MOTOR-METER LOCK.

1,423,822.　　　　　Specification of Letters Patent.　　Patented July 25, 1922.

Application filed December 13, 1920. Serial No. 430,133.

*To all whom it may concern:*

Be it known that I, LEE L. WINTERS, a citizen of the United States, and a resident of Ann Arbor, in the county of Washtenaw and State of Michigan, have made an invention appertaining to Motor-Meter Locks; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

My invention has for its object to provide a means for locking a motor meter to the neck of an automobile radiator and yet which is of such a character that the motor-meter may be readily removed so as to permit the radiator to be opened for the purpose of filling the radiator.

It particularly has for its object to provide a locking means which may be readily inserted through the neck of the radiator and then caught or locked in the radiator in such a way that it cannot be removed except by the use of special tools and with great difficulty.

The invention may be contained in structures of different forms, and to show a practical application of the invention I have selected a structure containing the invention as an example, and shall describe it hereinafter. The structure selected is illustrated in the accompanying drawings.

Figure 1 of the drawings is a side view of the locking means, showing parts of the automobile radiator in section. Fig. 2 is a side view of the locking means, a part of the lock being shown in section. Fig. 3 is a view of a part of the locking means showing it in unlocked position. Fig. 4 is an edge view showing the relationship of part of the locking means.

1 in Fig. 1 is a radiator of an automobile. 2 is the filling neck of the radiator which is usually closed by a cap. 3 is a motor meter of a type well known in the art to indicate the temperature of the interior of the radiator, particularly the temperature of the water which indicates to the driver certain conditions existing in the power mechanism of the automobile. It is connected to a cap 4 that is threaded onto the neck 2. It is provided with a threaded nipple 5 that extends below the cap 4 and in which the bulb of the thermometer used to indicate the temperature of the interior of the radiator, is located. The construction containing my invention is preferably connected to the threaded nipple 5 whereby the removal of the motor meter may be prevented, and yet at the same time the radiator may be opened to permit filling of the radiator through the neck 2.

A sleeve 6 is threaded onto the nipple 5. The sleeve 6 is provided with openings 7 in order that steam may fill the interior of the sleeve 6 and come in contact with the nipple 5 which contains the bulb of the thermometer. The sleeve 6 is also provided with an opening 8 near the end that is threaded onto the nipple 5, and when the sleeve 6 is threaded onto the nipple 5, solder 9 may be poured or run into the opening 8 to solder the nipple 5 and the sleeve 6 together so as to form an obstruction and prevent the sleeve 6 from being removed from the nipple 5.

The outer end of the sleeve 6 is closed and a swivelled eye 10 is connected to the sleeve 6. A shell 11 is connected to the swivelled eye 10 by means of the ear 12. The shell 11 is split at its free end. A cross bar 13 is pivoted in the free end of the shell 11 and between the portions 14 located on each side of the slots formed in the free end of the shell 11 which permits rotation of the cross bar 13 about the pin 15 and permits portions of the cross bar 13 to move in the shell 11.

A cross bar 13 is of a length such that when it is turned to a position that approximates alignment with the shell 11 it may be inserted through the neck 2, but it is also of a length sufficient that it will bridge across the neck 2 notwithstanding any position that the shell 11 may be placed in the neck so as to prevent removal of the shell 11 from the neck when the cross bar 13 is located in a transverse position.

Means is provided for locking the cross bar in position after the shell 11 and the cross bar have been inserted in the neck of the radiator. The cross bar 13 is provided with a circular recess 16 at a point above the pivot pin 15, and a ball 17 having a diameter substantially the same as that of the cylindrical shell 11 is located in the shell 11. The ball 17 fits the recess 16 formed in the cross bar 13 as well as the interior of the shell 11. The ball is free to rotate in the recess 16 and also in the shell 11 about any horizontal axis as well as about a vertical axis, that is, it is free to rotate about any axis extending in any direction. This is advantageous since the ball, when in position in the recess 16, blocks the movement of the cross bar 13 on the pivot pin 15 since the ball 17 will engage the wall 11 of the shell, and the ball 17 being free to rotate about any axis, the cross bar 13 cannot be unlocked by inserting a wire through the slotted end of the shell 11 and lifting the ball 17 as the ball will rotate and slip by a wire that may be used for this purpose. Moreover the ball 17 is spring pressed by the spring 18 that is located in the shell 11, and between one end of the shell 11 and the ball 17. The spring 18 not only prevents the ball from being lifted by a wire but also prevents the ball from being thrown out of the recess 16 by the up and down movements of the radiator caused by the springs of the automobile as it is driven along the road, whereby the cross bar 13 cannot be unlocked accidentally or intentionally by jouncing the ball 17 out of the recess 16.

If desired, a cross pin 19 may be located in the sleeve 11 so as to extend through the coils of the spring 18 at one end thereof, and through the slots 20 of the sleeve 11. This provides a convenient means for compressing the spring 18 to permit the ball 17 to drop out of the recess 16 when the shell 11 is turned upside down. This permits the cross bar 13 to be turned on the pivot pin 15 for when it is turned in the angular position shown in Fig. 3 the cross bar 13 and the shell 11 may be inserted through the neck 2 of the radiator since the ball 17 will be held by one or the other of the shoulders 21 formed on the cross bar 13. The cross bar 13 may then be snapped in position by merely causing one end thereof to be engaged by the lower edge of the neck or the top of the radiator. This will cause the cross bar 13 to turn to a horizontal position and the ball 17 will snap into the recess 16, and thus the motor meter will be locked to the radiator.

If desired the pin 19 may be withdrawn from the shell 11 by means of a pair of pliers, the heads of the pin 19 being small enough to be pulled through the slots 20 when pulled with sufficient force.

I claim:

1. In a motor meter lock a shell adapted to be connected to the motor meter, a member located in the shell rotatable about an axis at right angles to the axis of the shell, a cross bar connected to the shell, and means for connecting the cross bar with the rotatable member to prevent movements of the cross bar relative to the shell.

2. In a motor meter lock a shell, means for connecting the shell to the motor meter, a cross bar having a circular recess, a ball located in the shell and fitting the recess of the cross bar and locking the cross bar in a transverse relation with respect to the shell, and a spring located intermediate the member and the end of the bar for yieldingly holding the member in locking position.

3. In a motor meter lock a shell connected to the motor meter, a cross bar pivoted to one end of the shell and having a circular recess, a ball substantially fitting the interior of the shell and the recess and a spring located intermediate the ball and one end of the shell for holding the ball in the recess and a pin extending transversely through the spring and the shell for withdrawing the spring from the ball.

4. In an automobile motor meter lock, a shell adapted to be connected to the motor meter and extending into the neck of the radiator of the automobile, a cross bar pivoted to the shell and having an ear extending into the shell, the ear having a circular recess a spring-pressed member rotatable about an axis at right angles to the axis of the shell for locking the cross bar from movement relative to the shell, the cross bar being pivoted to the shell at a point below the ear.

5. In an automobile motor meter lock, a shell adapted to be connected to the motor meter and to extend into the neck of the radiator of the automobile, and having slots located at the lower end of the shell and on opposite sides of the shell, a cross bar pivotally connected to the lower end of the shell and located in the slots, the cross bar having an ear extending into the shell and movable in the slots, the ear having a circular recess, a ball rotatable in the shell in all directions and substantially fitting the shell and the recess and for locking the cross bar from movements relative to the shell, the cross bar being pivoted to the shell at a point below the ear.

6. In an automobile motor meter lock, a member adapted to be connected to the motor meter and having a part whose end is located substantially at the inner end of the neck of the radiator of the automobile when the lock is placed in locking position, a cross bar pivotally connected at the said end of the member, and a locking means located at the said end of the member and substantially at the pivot of the cross bar for yieldingly holding the cross bar in one position for insertion of the member and cross bar into the neck of the radiator and for locking the cross bar in a position transverse to the member and from rotation about the said pivot.

In testimony whereof I have hereunto signed my name to this specification.

LEE L. WINTERS.